Aug. 8, 1944. V. F. ZAHODIAKIN 2,355,196
FASTENING DEVICE
Filed Nov. 20, 1940 2 Sheets-Sheet 1
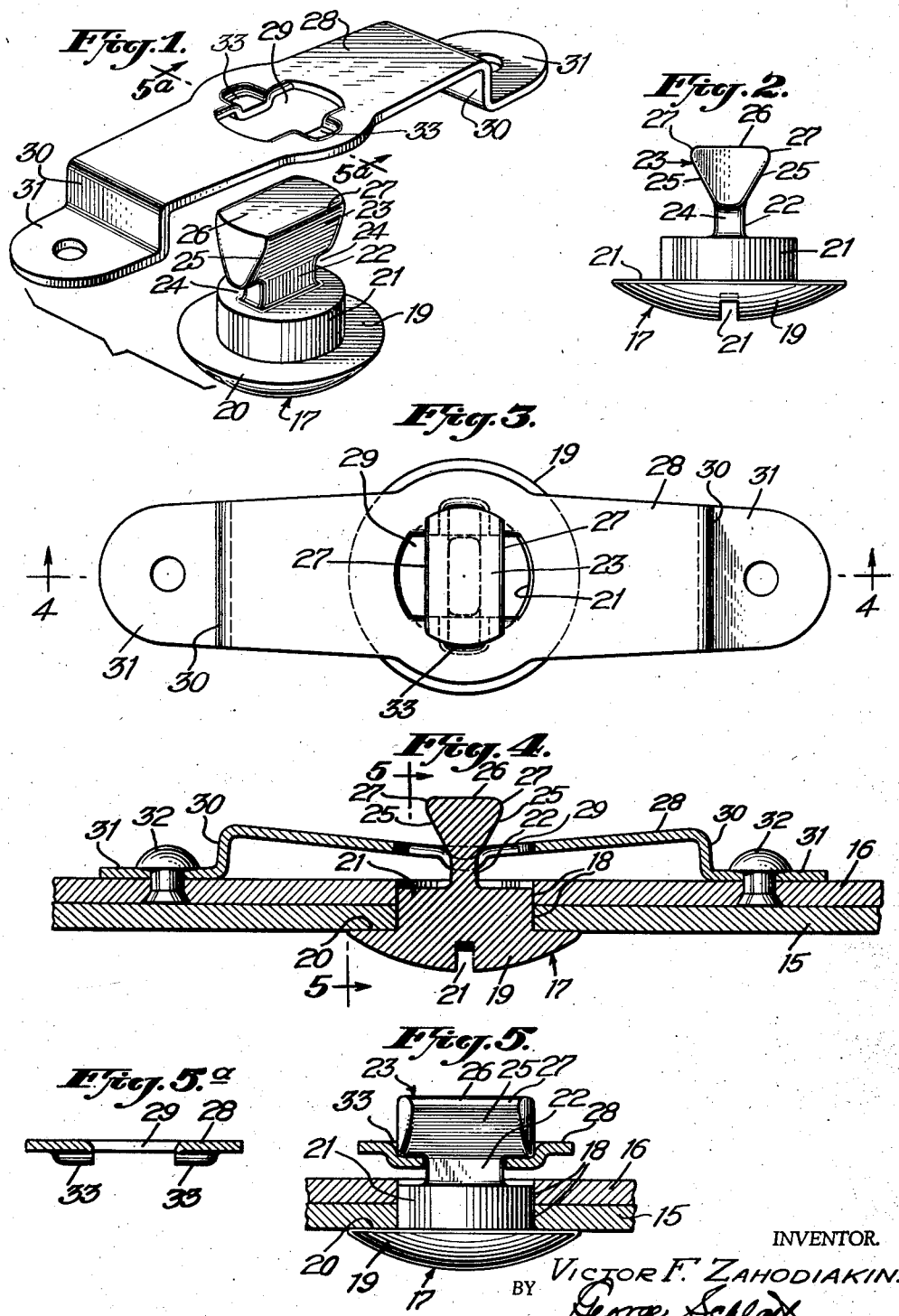
INVENTOR.
VICTOR F. ZAHODIAKIN.
BY George Schlau
ATTORNEY Aug. 8, 1944. V. F. ZAHODIAKIN 2,355,196
FASTENING DEVICE
Filed Nov. 20, 1940 2 Sheets-Sheet 2
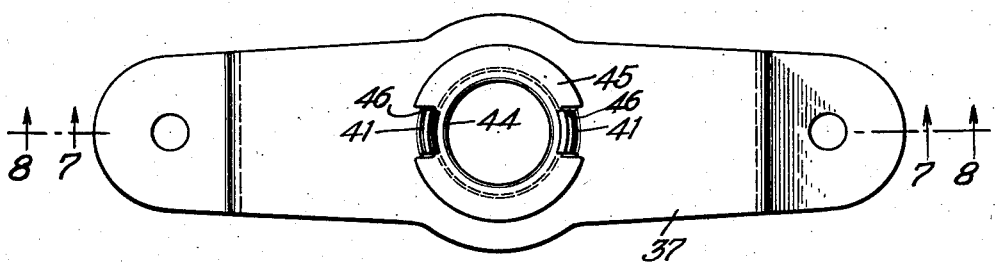
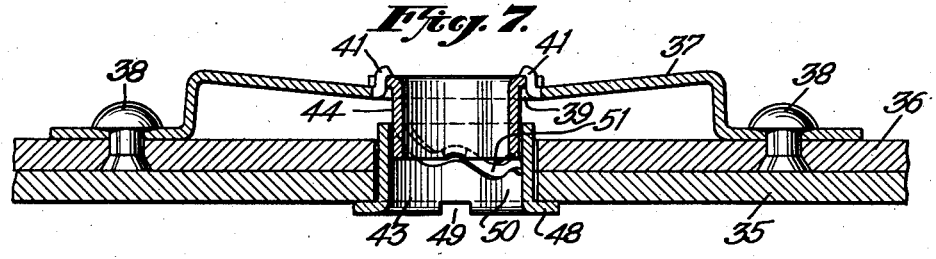
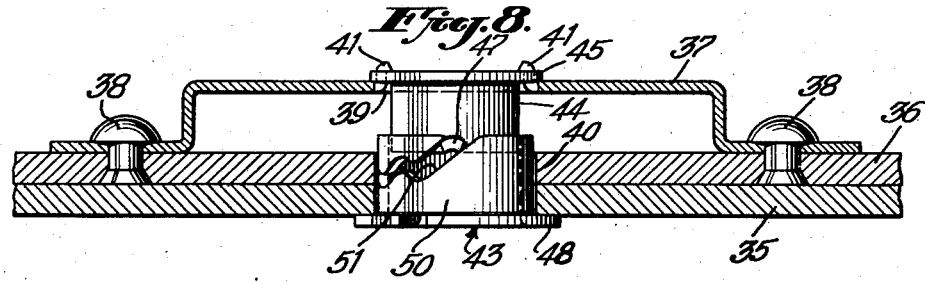
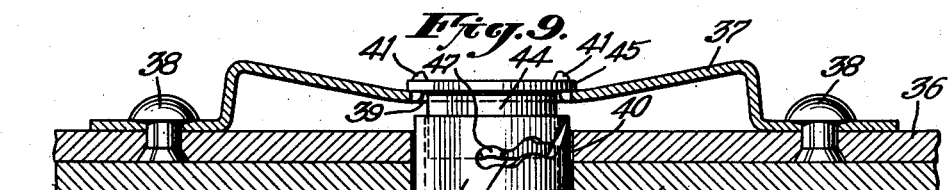
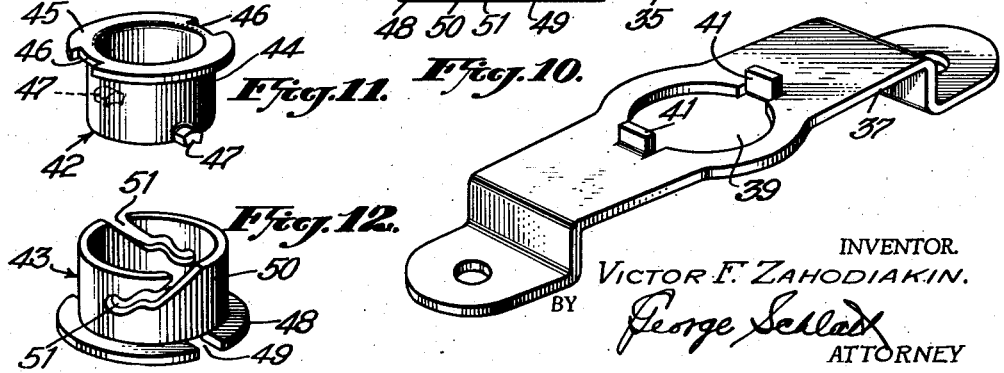
INVENTOR.
VICTOR F. ZAHODIAKIN.
BY George Schlott
ATTORNEY Patented Aug. 8, 1944

2,355,196

UNITED STATES PATENT OFFICE 2,355,196

FASTENING DEVICE

Victor F. Zahodiakin, Maplewood, N. J.

Application November 20, 1940, Serial No. 366,397

3 Claims. (Cl. 24—221)

This invention relates to improvements in fastening devices, and more particularly fastening devices for releasably clamping and locking together a plurality of juxtaposed members.

Objects

Among the principal objects which the present invention has in view are: to provide an improved fastening device having means for securely clamping together a plurality of juxtaposed members; to provide a locking device having means whereby said device when locking a plurality of members in juxtaposition may be operated in either clockwise or anti-clockwise direction; to provide a fastening device which is durable, simple and practical, and minimize becoming loose from a locked condition due to vibration; to provide a fastening device which will operate two ways when securely locking a plurality of members together; to provide a fastening device having a cam action when applying the same to a plurality of members and locking together the members in juxtaposition; to provide an improved fastening device with one part thereof having means for receiving another part for clamping together a plurality of juxtaposed members; to provide one of the juxtaposed members with means whereby the fastening device will engage a portion thereof under pressure and securely clamp together the plurality of juxtaposed members; to be enabled to disengage the fastening device from a clamping and/or locking position of the plurality of juxtaposed members by turning the device in either a clockwise or anti-clockwise direction; to provide an improved construction of fastening device which requires no intricate machinery to manufacture the device of a precision type; to provide a fastening device having engaging surfaces with cam principle when clamping together a plurality of juxtaposed members; to secure simplicity of construction, installation, minimum cost to manufacture and operation; and to obtain other advantages and results as may be brought out in the following description.

Drawings

Figure 1 is a perspective view of my improved fastening device showing the locking member as disengaged from its retaining member;

Figure 2 is an end elevation of the locking member;

Figure 3 is a plan view of the fastening device in assembled condition;

Figure 4 is a longitudinal sectional view shown as taken on line 4—4 of Figure 3;

Figure 5 is a transverse sectional view shown as taken on line 5—5 of Figure 4;

Figure 5a is a transverse sectional view of a central part of the retaining member shown as taken on line 5a—5a of Figure 1;

Figure 6 is a plan view similar to Figure 3 and showing a slightly modified construction;

Figures 7 and 8 are longitudinal sectional views shown as taken on lines 7—7 and 8—8 of Figure 6 and showing the device in stages of clamping together a plurality of juxtaposed members;

Figure 9 is a similar view and showing the fastening device as securely clamping together the plurality of juxtaposed members;

Figure 10 is a perspective view of the retaining member of modified construction; and Figures 11 and 12 are perspective views of the locking members.

Description

Referring now more particularly to Figures 1 to 5a of the drawings, there is shown a preferred embodiment of the invention of my improved fastening device securing or locking together a plurality of juxtaposed members, such as plates, one of which may for convenience be termed the main plate 15, such as used in the construction of aeroplanes, automobiles, buildings and so forth, and the other member 16 a complementary plate, such as a cover plate for the service opening of aeroplanes, automobiles, buildings and so forth. It is to be understood that though only two such juxtaposed plates are shown, any number of plates may be clamped securely together.

The fastening device comprises essentially two elements, one of which preferably is in the form of a stud 17 which passes through and fits apertures 18 of the plates 15 and 16. Said stud is provided with a head 19 having a shoulder 20 which engages and abuts against the under surface of the main plate 15. In order that said device may be properly adjusted for clamping together the plates, it is desirable that the head 19 be provided with a kerf 21 for a screw driver. However, a slotted head is not deemed a necessity in the application and use of the device, as other constructions may conveniently be utilized if desired, such as a square head bolt or the like adapted to be engaged by a wrench, or other suitable tool.

The stud 17 preferably may be of sufficient length and provides a cylindrical shank 21 of a diameter substantially that of the apertures 18 in the plates 15 and 16, and of a length slightly less than the combined thickness of the plates when in clamped condition. Adjacent to and in continuation of said shank 21, the stud provides an intermediate reduced body or neck portion 22 which in construction is rectangular in shape, the longitudinal portion thereof being somewhat less in length than the outside diameter of the shank 21 and substantially narrower in width. Extending upwardly from said reduced body portion and integral therewith is a somewhat larger rectangular shaped member 23 having a dimensional length equal to the outside diameter of the shank 21 with its outer extremity of a curvilinear contour similar to the circumferential surface of said shank. Said outer ends of said member 23 provide a space 24 on either side between the upper part of the shank and underside of the projecting ends of the said member, the purpose of which will hereinafter be more fully described.

Since said member 23 is a continuation of the intermediate body or neck portion 22, the elongated side portions thereof extend upwardly and outwardly at a convenient angle, thereby providing a pair of angularly disposed straight side walls 25, 25 and terminating at the upper part thereof in a substantially flat upper wall 26 and providing rounded corner portions 27, 27. Said angular side walls in actual practice will accordingly provide a cam principle during application in clamping a plurality of juxtaposed members together, such as illustrated in Figures 4 and 5. It may be noted at this time that the member 23 with its angular side walls is constructed of a fine finish and may be cheaply manufactured, requiring minimum time and operation and allows for extreme accuracy with the obtaining of a fine surface finish during grinding operation of the same. It further permits the elimination of intricate tooling to make the device of the so-called precision type, and which has not been accomplished in the manufacture of devices heretofore known and on the present day market. Further, and as illustrated in the drawings, the angular side walls may be of varying degrees, though as illustrated the showing is of approximately a thirty degree angle on each side.

In carrying out the invention and juxtaposed to the plate member 16 is provided a retaining yoke 28, preferably of metal and having an elongated aperture 29 in alinement with apertures 18, and of a length slightly in excess to the widest portion of the member 23, and the outer ends of the widest width having a slightly larger radii than the cylindrical body portion of the member 23. The said retaining yoke 28 preferably is rectangular in shape with its outer ends bent downwardly to provide side walls 30, 30 and then bent outwardly to lie flatwise against the plate member 16 and providing tongues or ears 31, 31. In order to prevent dislodgement of the yoke from the plate member 16 there may be provided suitable retaining means extending through from the outside of the tongues or ears and through the thickness of the said plate 16. One such means conveniently may be in the form of bolts or rivets 32, 32. Due to the said side walls 30, 30, the yoke 28 at its central part is raised or bridged away from the plate member 16, and due to this construction will provide sufficient give or resiliency to the material and act as a spring member when applying the stud 17 with its several parts for locking or clamping together the juxtaposed plates 15 and 16.

At approximately midway of the aperture 29 and extending transversely outwardly from the inner walls thereof, the material of the yoke is depressed downwardly slightly to provide recesses or depressed shoulders 33, 33 of a width substantially that of the member 23. These recesses preferably terminate adjacent the outer edges of the yoke and are of the length of aperture 29. In passing it is to be noted the side walls of the recesses preferably are rounded slightly to insure easy reception of the member 23 when sliding the same therein for locking or clamping together the juxtaposed plate members.

In operation, and referring now more particularly to Figures 4 and 5, the plate members 15 and 16 may now be clamped or locked together in juxtaposition and in order to minimize rattling or looseness of the plate members for the uses heretofore specified, the removable fastening device may now be utilized. The respective plates are in alinement with regards to the apertures 18 and the registering slotted opening of the spring yoke 28. The stud 17 is now inserted into the apertures 18 with the head 19 and shoulder 20 engaging the plate member 15. The shank 21, and the upper member 23 at its widest part, conveniently passes through the apertures 18 with the member 23 passing through the aperture 29 of the spring yoke 28. An instrument, such as a screw driver may now be inserted in the kerf 21 of the stud head 19 and may be turned in either a clockwise or anticlockwise direction for approximately ninety degrees. In turning the stud head the member 23 likewise will move ninety degrees or a one quarter turn in either direction, and in so doing the upwardly and outwardly extending angular side walls 23, 23 will engage the rounded corner edges of the aperture 29 in the spring yoke 28. Slight downward pressure is exerted against the spring yoke due to the cam action of the angularly disposed walls and as the ninety-degree or one quarter turn is nearly completed the outer projecting ends or wings of the member 23 will immediately slide into the depressed shoulders or recesses 33 thereby securely locking or clamping together the juxtaposed plate members 15 and 16. When desiring to release the fastening device from the locked plates, the stud head may be given a ninety degree or one quarter turn in either direction, or until the member 23 is in registration with the aperture 29 at which time the stud may then be removed. As the yoke is sufficiently resilient and due to the rounded corners of the recesses 33 and cam member 23 only slight friction is obtained by the engaging parts as the spring yoke will give slightly under the pressure exerted by the cam member thereagainst. In other words a sliding action in either direction, clockwise or anti-clockwise, of the cam member will either clamp or lock the juxtaposed plate members or release them. Such a construction and operation will accordingly present one-hundred per cent more efficiency and longevity to the fastening device.

Referring now more particularly to Figures 6 to 12 inclusive, there is shown a fastening device of slightly modified construction. As in the showing of my preferred construction there may be a plurality of plate members 35 and 36 juxtaposed one to the other. The one plate member has a rectangular yoke or bridged spring member 37 suitably attached to the plate member 36 at its outer ends as by rivets or bolts 38, 38 as previously described. However, in the present showing there is provided a circular opening 39 centrally of the spring member and of a dimension substantially that of the apertures 40 in the plate members 35 and 36. Punched upwardly and inwardly of said opening 39 of the same material of the spring member is a plurality of ears or upstanding projections 41, 41. These said upstanding ears preferably are situated towards the outer longer ends of the spring member and centrally thereof.

The locking member as shown consists of two or more hollow tubular members, and for clarity the showing is that of two such members 42 and 43. The one member 42 in construction has a body portion 44 and of a dimension slightly smaller than the inside dimension of the circular aperture 39. In practice this said member is inserted downwardly into the aperture 39. At the top part thereof the tubular member 42 preferably is bent outwardly to provide a flange or collar 45. Said flange or collar is provided with cut-out portions 46, 46 arranged oppositely to each other and of a width substantially that of the upstanding ears or projections 41 formed of the aperture 39. As the said tubular member is set in place, the cut-out portions will fit over the upstanding ears and the said ears may then be clamped inwardly towards the opening and securely adjusted to abut against the flange or collar 45, thereby securely holding the tubular member to the spring member 37 and will prevent accidental turning of said tubular member. Stamped out of the side wall of the body portion 44 and in spaced and staggered relationship is provided a plurality of curvilinear lugs 47.

The other said tubular member 43 has an inside diameter sufficiently large to encompass the body portion of the tubular member 42 and in practice is slid upwardly into the apertures 40 of the plate members 35 and 36, and also has a flange 48 at the bottom thereof which will engage the bottom of the plate member 35 and said flange has a kerf 49 to accommodate a screw driver for turning the member when locking the same to the inner fitting tubular member 42. The body portion 50 of said tubular member 43 is provided with a plurality of irregular and downwardly extending spiral grooves or tracks 51 and notched at spaced intervals. When applying this said tubular member 43 to the upper and smaller tubular member 42 it is to be noted that the open ends of the spiral grooves or tracks will be in registration with the rails or lugs 47 of the tubular member 42. The said tubular member 43 may then be screwed upwardly to enclose the member 42 and in so doing the rails or lugs will ride downwardly in the grooves and cause the spring member 37 to be depressed in a direction towards the plate member 36, thus assuring a secure locking of the juxtaposed plate members. However, it may be here stated that the members may be tightly locked without the rails being in their lowermost position in the grooves, and should they be only part way down, further adjustment may be made in case of the plates becoming loose through long use and the members 43 may then be turned until the rails are all the way down in the tracks.

I claim:

1. A fastening device of the character described comprising a locking device in combination with a plurality of plate members, said locking device providing a neck and a cam member having an enlarged portion and a reduced portion merging one to the other with flaring side walls, the cross-sectional area of the cam member transverse thereof and longitudinally of the neck being greater than that of the neck in the same plane, and the cam member being symmetrical with respect to the neck and adapted to be inserted straight through said plurality of plate members to its innermost position and thereafter rotated 90° for locking said plate members in clamped condition, said locking device having a bridged spring member attached to one of said plate members, said spring member having a rectangular aperture and having depressed portions next the aperture facing away from said plate members, said bridged spring member adapted to be depressed, said cam member having a stem rotatable in said aperture, and said flaring side walls projecting laterally from said stem and converging downwardly and thereby rotatable in either clockwise or counter-clockwise direction into locking position, whereby when turning the locking device in either clockwise or anti-clockwise direction to locked position the said side walls will ride against the sides of the rectangular aperture to depress the spring member and enable the reduced portion of the cam member to be rotated over the spring member and into registration and engagement with said depressed portions thereby securely locking together the juxtaposed plate members.

2. A fastening device of the character described for clamping together a plurality of juxtaposed plates, a spring yoke having an aperture extending in one direction and recesses extending in a transverse direction, the recesses being aligned and presenting overall length between outer ends substantially equal to the length of the aperture, a stud having a head, a neck and a transverse member symmetrical with respect to said neck and with its top both wider and longer than the corresponding parallel dimension of the neck, said neck being disposed between the head and transverse member and said member projecting at its ends beyond the neck and having an overall length substantially equal to the length of the aperture and of the overall length of recesses, and the longitudinal side faces of said transverse member sloping outwardly upward providing like cam surfaces on both sides of the member to be turned in either direction to seat or unseat the ends thereof in or from said recesses.

3. A fastening device of the character described for clamping together a plurality of juxtaposed plates, a spring yoke having an aperture extending in one direction and of equal width throughout its length, said yoke having recesses extending in a transverse direction to said aperture the overall length from outer end of one recess to the outer end of the other being substantially equal to the length of the aperture, said recesses being aligned with each other and of equal length and said recesses having a less width than the width of said aperture and having flat bottoms and sloping sides, a stud having a head, a neck and a transverse member, said neck being disposed between the head and transverse member and said member projecting at its ends beyond said neck at each side thereof a distance substantially equal to the length of one of said transverse recesses, the top of said member having a length and width substantially equal to the length and width of said aperture and the bottoms of the ends projecting beyond the neck each having a length and width substantially equal to the flat bottom of one of the said recesses, and the longitudinal side faces of said transverse member sloping outwardly upward constituting like cam surfaces on both sides of the member enabling the member to be turned in either direction to seat or unseat the ends thereof in or from said recesses, the said bottom of the member when in seated position engaging said flat bottoms of the recesses and the sloping sides of the recesses being equally resistive to riding of the sloping sides of the cam member out of the recesses in either clockwise or counter-clockwise direction.

VICTOR F. ZAHODIAKIN.